(12) United States Patent
Doll et al.

(10) Patent No.: US 8,298,460 B2
(45) Date of Patent: Oct. 30, 2012

(54) METHOD FOR GRANULATING AND CRYSTALLIZING THERMOPLASTIC POLYMERS

(75) Inventors: Andreas Doll, Aschaffenburg (DE); Frank Glöckner, Aschaffenburg (DE)

(73) Assignee: Automatik Plastics Machinery GmbH (DE)

( * ) Notice: Subject to any disclaimer, the term of this patent is extended or adjusted under 35 U.S.C. 154(b) by 383 days.

(21) Appl. No.: 12/531,295

(22) PCT Filed: Mar. 5, 2008

(86) PCT No.: PCT/EP2008/001745
§ 371 (c)(1),
(2), (4) Date: Feb. 26, 2010

(87) PCT Pub. No.: WO2008/110290
PCT Pub. Date: Sep. 18, 2008

(65) Prior Publication Data
US 2010/0140821 A1   Jun. 10, 2010

(30) Foreign Application Priority Data
Mar. 15, 2007   (DE) .......................... 10 2007 012 450

(51) Int. Cl.
*B29B 9/00*   (2006.01)
(52) U.S. Cl. ............. 264/5; 264/140; 264/340; 264/345
(58) Field of Classification Search .................... None
See application file for complete search history.

(56) References Cited

U.S. PATENT DOCUMENTS

| | | | |
|---|---|---|---|
| 6,852,256 B2 * | 2/2005 | Borer et al. | 264/40.6 |
| 7,192,545 B2 * | 3/2007 | Ekart et al. | 264/211.13 |
| 7,204,945 B2 * | 4/2007 | Bonner | 264/143 |
| 7,250,486 B1 * | 7/2007 | McGehee | 528/308 |
| 7,790,840 B2 * | 9/2010 | DeBruin et al. | 528/480 |
| 2005/0085620 A1 * | 4/2005 | Bruckmann | 528/480 |

FOREIGN PATENT DOCUMENTS

| | | |
|---|---|---|
| DE | 19848245 A1 | 5/2000 |
| DE | 10144747 A1 | 3/2003 |
| DE | 60023831 T2 | 8/2006 |
| EP | 1522395 A | 4/2005 |
| WO | 03/031133 A1 | 4/2003 |

OTHER PUBLICATIONS

International Search Report issued on Aug. 21, 2008 in International Application No. PCT/EP2008/001745.

* cited by examiner

*Primary Examiner* — Mary F Theisen
(74) *Attorney, Agent, or Firm* — Pillsbury Winthrop Shaw Pittman LLP

(57) ABSTRACT

The invention relates to a method for granulating and crystallizing thermoplastic polymers, the granules being contained in a liquid after granulation of a polymer melt and the granules being nucleated in the liquid once the pressure of the liquid is increased and the temperature of the liquid is increased, and the granules being crystallized in the liquid once the pressure of the liquid is again increased and the temperature of the liquid is again increased. According to the invention, the granules are removed from the liquid once the pressure and the temperature of the liquid containing the granules have been reduced.

23 Claims, 3 Drawing Sheets

METHOD FOR GRANULATING AND CRYSTALLIZING THERMOPLASTIC POLYMERS

CROSS REFERENCE TO RELATED APPLICATIONS

This application is a U.S. National phase of International Application No. PCT/EP2008/001745 filed Mar. 5, 2008, which claims priority to German Patent Application No. 10 2007 012 450.5, filed Mar. 15, 2007. The contents of both applications are incorporated herein by reference in their entireties.

The present invention relates to a method for granulating and crystallizing thermoplastic polymers.

In general, granulates of partially crystallized thermoplastics tend to stick together when heated to temperatures above their glass transition temperature ($T_G$). To further process polymer granulates of this type, however, heating the granules to temperatures above the glass transition temperature ($T_G$) is unavoidable. The granules are therefore treated, for example by crystallization—at least their surfaces being crystallized thereby—in such a way that they may be further used or further processed without sticking together. Polymer granulates of this type may be used, for example, in the production of plastic bottles.

The known crystallization processes are generally relatively complex, since a conditioning/crystallization takes place in multiple sequential steps, particularly energy-intensive thermal treatment steps being used, in particular, in order to make the polymer granulates suitable for further processing. Furthermore, the process parameters are frequently very difficult to control on a large industrial scale since, for example, even slight temperature fluctuations may cause clumping of granules and thus bring the processes used to a standstill. In the known methods, several different conditioning steps requiring controllers that must be specially coordinated with each other as well as special apparatuses, are also frequently known for the treatment of polymer granulates, it being possible, however, to control these processing steps only with difficulty in large production volumes.

Granules made of thermoplastic polymers are currently produced, for example, by strand granulation or by underwater granulation.

Patent specification WO 03/031133 A1 describes a method for crystallizing polymer material, wherein, prior to the crystallization step, the polymer material is subjected to one or more conditioning steps in which a specific water content and/or a specific mater content profile is set in the polymer material for the purpose of improving the ability to further treat the corresponding material. Water vapor, for example, is provided therein as the medium in which corresponding materials are treated.

German unexamined patent application DE 198 48 245 A1 describes a method for granulating and crystallizing thermoplastic polyesters or copolyesters, wherein the polymer crystallization process is accelerated by introducing a corresponding intermediate product into a liquid, wherein the method described herein is used for strand granulation, wherein the strands are granulated before and/or after treatment with the aid of the liquid, in that the intermediate product is first discharged from a nozzle in the form of strands, immersed in a first liquid bath, granulated into pellets, and the pellets are then immersed in a second liquid bath, the pellets being crystallized in the liquid baths.

In the method cited above, the provision of different liquid baths and/or cooling media is generally relatively complex and may involve the tendency to be susceptible to errors in the fine-tuning of the process parameters.

The object of the present invention is therefore to provide a method for granulating and crystallizing thermoplastic polymers which overcomes the disadvantages of the prior art and, in particular, to provide a method which offers a relatively easy-to-control means of quickly and reliably producing easy-to-process granules even on a large industrial scale involving large material throughput rates, without the use of highly complex apparatuses.

The method according to the invention for granulating and crystallizing thermoplastic polymers may generally be used for all crystallizable polymers, in particular for thermoplastic polyesters or copolyesters, preferably, for example, polyamide, POM, polyolefines or PET, preferably PET having an intrinsic viscosity IV of 0.5 to 1.2 g/dl. The method according to the invention may further be used for polyamide (PA), polylactide (PLA), thermoplastic elastomers (TPE) and hot melt.

The method according to the invention for granulating and crystallizing thermoplastic polymers is characterized by the following steps:

Granulating a polyester melt for the purpose of producing granules;
Supplying the granules to a liquid under a pressure d1 and at a temperature T1;
Increasing the pressure of the liquid, including the granules contained therein, to a pressure d2>d1; and
Increasing the temperature of the liquid, including the granules contained therein, to a temperature T2>T1;
Nucleating the granules in the liquid under pressure d2 and at temperature T2;
Increasing the temperature of the liquid, including the granules contained therein, to a temperature T3>T2;
Crystallizing the granules in the liquid at temperature T3;
Decreasing the pressure and temperature of the liquid, including the granules contained therein, to a pressure d4 and a temperature T4; and
Separating the granules from the liquid.

In the method according to the invention, the step for increasing the pressure to a pressure d2>d1 and the step for increasing the temperature to a temperature T2>T1 may take place simultaneously.

In the method according to the invention, any suitable liquid, preferably water, may be used as the liquid. If necessary, additives may also be included in the liquid which act as nuclei to start or accelerate and/or improve nucleation of the granules in the liquid.

The method according to the invention may have multiple pressure and temperature stages, however preferably two stages. Three or more stages of this type are also possible according to the invention. The number of stages used may depend, for example, on the polymer properties. The method according to the invention is generally designed in a cascade-like manner, i.e. in a sequence of multiple pressure or temperature stages.

Among other things, the present invention provides the advantage over the prior art that by the combined control of the pressure and/or temperature of a liquid, the granules located in the liquid may be easily nucleated and subsequently crystallized in a controlled manner. Such a method according to the invention is thus relatively easy to control or regulate and is also suitable for large material throughput rates, since a continuous process is possible without problems. For example, it is not necessary according to the invention to pretreat or transport the granules in different conditioning steps in different media; according to the invention, only one liquid is required, in which the granules may remain during the method according to the invention, i.e., the granules do not have to be transferred, for example, to different baths/treatment media. This applies to granulation of the polymer melt, e.g. by strand granulation as well as, for example, by underwater granulation.

In the method according to the invention, the liquid, including the granules contained therein, may be advantageously supplied in a closed system, i.e. for example separated from environmental influences. This makes it possible for the liquid to conduct the granules particularly easily and effectively. In particular, the preferred closed system according to the invention may include a sequence of pipes and/or interconnected closed reaction vessels that are filled with the liquid.

To particularly reliably prevent the granules contained in the liquid from sticking together, the liquid and the granules contained therein may be kept in motion in the method according to the invention, preferably keeping them in motion during the entire process during which the granular are located in the liquid.

If a multi-stage process is used, the method according to the invention may include the following further steps:
Additionally increasing the pressure of the liquid, including the granules contained therein, to a pressure $d3>d2$ following nucleation;
Crystallizing the granules in the liquid under pressure $d3$ and at temperature $T3$.

If the method is carried out in multiple stages, the pressure and the temperature of the liquid, including the granules contained therein, may first be decreased to a pressure $d5>d4$ and a temperature $T5>T4$ following crystallization. Afterwards, the pressure and temperature of the liquid, including the granules contained therein, may be decreased to pressure $d4$ and temperature $T4$.

Temperature $T4$ main be the ambient temperature.

Temperature $T1$ may preferably lie in a range between 20° C. and 100° C.

Temperature $T2$ may lie in a range between 80° C. and 180° C., preferably in a range between 110° C. and 130° C.

Temperature $T3$ may lie in a range between 110° C. and 200° C., preferably in a range between 120° C. and 160° C.

Pressure $d4$ may be equal to pressure $d1$.

Pressure $d1$ may be atmospheric pressure.

Pressure $d2$ may lie in a range between 1 bar and 10 bar, preferably in a range between 1 bar and 3 bar.

Pressure $d3$ may lie in a range between 1 bar and 10 bar, preferably in a range between 2 bar and 6 bar.

In the method according to the invention, the step of nucleating the granules in the liquid may have a nucleation period of up to 10 minutes, preferably a nucleation period in the range between 1 minute and 10 minutes, and more preferably a nucleation period in the range between 2 minutes and 4 minutes. The nucleation period may be selected according to polymer material, pressure and temperature.

In the step for crystallizing the granules in the liquid, a crystallization period of up to 30 minutes may be provided, preferably a crystallization period in the range between 1 minute and 10 minutes, and more preferably a crystallization range in the range between 2 minutes and 4 minutes. The crystallization period may be selected according to the polymer material used.

The invention is explained in greater detail below on the basis of the figures, where:

FIG. 1 shows a schematic view of a device or a system that may be used to carry out the method according to the invention, a strand granulation device being used. The method according to the invention is explained on the basis of this figure.

Figure 1:
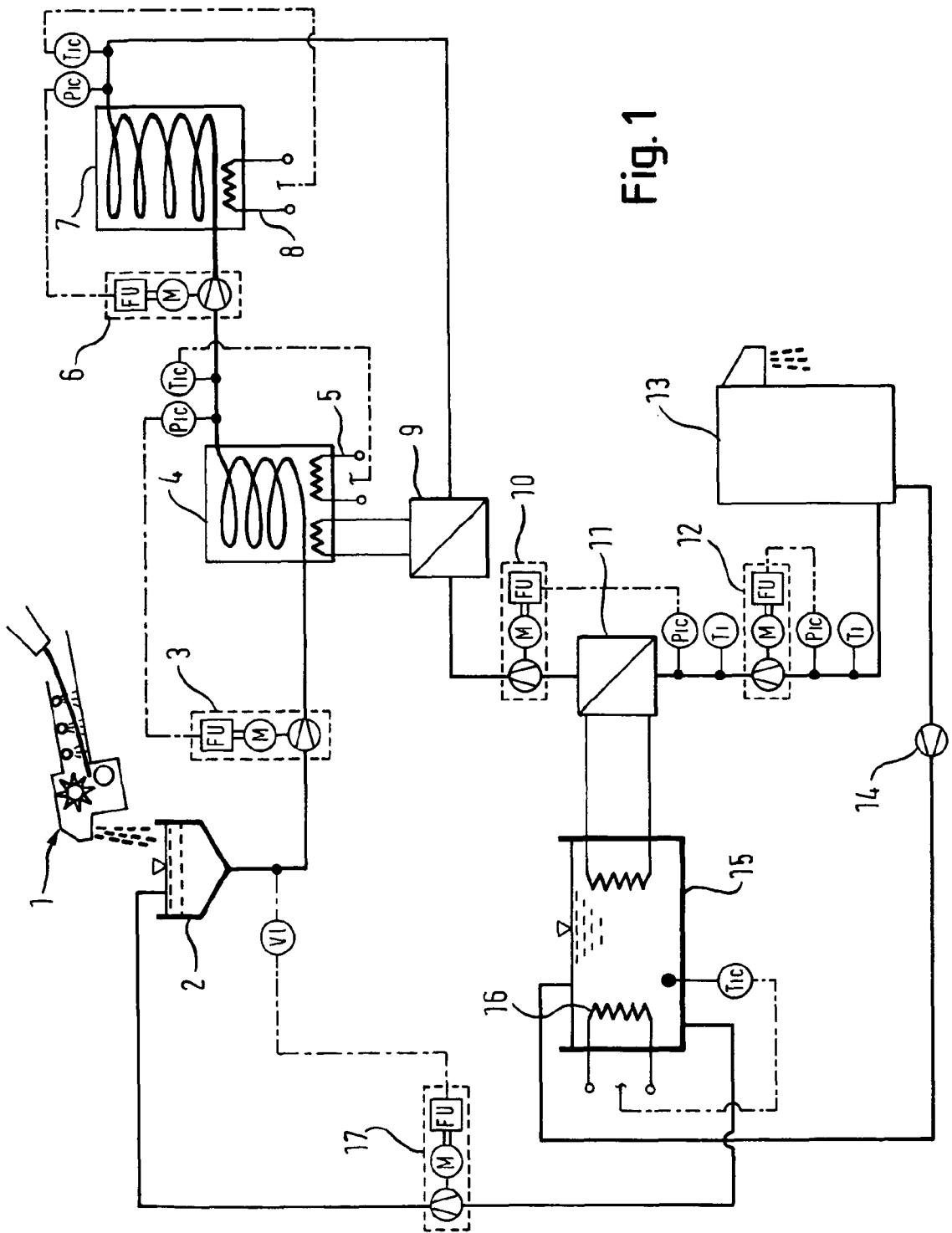
FIG. 1 shows a schematic view of a first device that may be used to carry out the method according to the invention, a strand granulation device being used for granulation.

In FIG. 1, a melt of thermoplastic polymers is discharged in the form of a strand and supplied to a granulator 1 via a chute with the aid of water and cut into granules. This is a strand granulation method that is essentially familiar to those skilled in the art and therefore does not need to be described in greater detail in this context.

The granules are supplied to a liquid via a mixing vessel 2, this liquid having a pressure $d1$ and a temperature $T1$. Pressure $d1$ is preferably atmospheric pressure. Water is preferably used as the liquid. The liquid, including the granules contained therein, is supplied to a booster pump 3. In this case, additional temperature-regulated liquid may be supplied by a pump 17 from a storage tank 15. With the aid of suitable feedback control, including a volumetric flow measurement, in the liquid conduction system, a constant volumetric flow may be set and maintained in the preferably closed liquid conduction system, including the granules contained therein, with the aid of pump 17, by measuring the volumetric flow downstream from mixing vessel 2.

Temperature $T1$ of the liquid may lie in range between 20° C. and 100° C. or up to the boiling temperature of the liquid, e.g., the water. The ratio between liquid and granules contained therein is preferably set in such a way that there is no more than 35% granules per volume of liquid, preferably no more than 15% granules per volume of liquid.

The granules present in the liquid are not crystallized until after the granules in the liquid have been nucleated. In this case, at least the outer layer of the granules is subjected to nucleation. This forms crystallization nuclei. Suitable nucleation agents may be embedded into the material of the thermoplastic polymers ahead of time. However, crystallization nuclei may also be introduced from the outside by diffusion. In particular, if PET is used as the polymer material, water is a suitable source for nucleation.

The nucleation of the granules in the liquid takes place after the pressure has been increased to pressure $d2>d1$ by booster pump 3. Pressure $d2$ preferably lies in the range between 1 bar and 10 bar. The temperature of the liquid, including the granules contained therein, downstream from booster pump 3 is approximately the same as the temperature upstream from booster pump 3. The liquid, including the granules contained therein, is pumped by booster pump 3 to a pipe that is used in spiral form in a nucleation vessel 4, whose temperature is regulated by heat transfer oil, steam or by supplying water. In this case, the liquid, including the granules contained therein, is heated to a temperature $T2>T1$. This temperature $T2$ is the nucleation temperature required for the specific material of the granules produced. The heat transfer oil or steam is heated or regulated accordingly to the temperature suitable for achieving temperature $T2$ with the aid of a temperature regulator 5 and, if necessary, by passing through a heat exchanger 9 that uses the waste heat from one of the subsequent stages. The cross section of the pipe used is generally dimensioned in such a way that the speed of the liquid, including the granules contained therein, is sufficient, this sufficient speed lying above the settling rate of the granulate.

The length of the pipe used, in particular the length of the pipe used in the temperature-regulated nucleation vessel 4, is determined from the nucleation period required for the specific material, i.e. from the corresponding retention time. In determining the retention time, the selected pipe cross section must also be taken into account. The preferred nucleation period lies in the range of up to 10 minutes and is dependent on the material to be crystallized.

At the end of the nucleation stage, a further booster pump 6 is situated in the system illustrated schematically in FIG. 1. The liquid pressure upstream from the pump is pressure d2, which is set and maintained at a constant level via a pressure sensor at this point and by feedback control by frequency-controlled driving of booster pump 3. The temperature present therein does not necessarily have to match temperature T2. However, the temperature at that point may be maintained at a constant level with the aid of temperature regulator 5 via suitable feedback control, using the temperature signal by means of measurement at this point. Temperature T1 preferably lies in a range between 20° C. and 100° C., temperature T2 preferably lies in a range between 80° C. and 180° C., preferably between 110° C. to 130° C.

Since the crystallization of commonly used materials usually achieves its optimum reaction rate at much higher temperatures than does the nucleation of such materials, in the method according to the invention, the temperature of the liquid, including the granules contained therein, is increased to a temperature T3>T4 after the granules have been nucleated in the liquid having pressure d2 and temperature T2. At the same time, according to a preferred embodiment of the method according to the invention, the pressure of the liquid, including the granules contained therein, may be additionally increased to a pressure d3>d2 following nucleation. The granules in the liquid are then crystallized at a temperature T3 and, if necessary, under a pressure d3. Depending on the material used, crystallization temperature T3 may preferably lie between 110 C and 200 C in water. Water pressure d3 may lie, for example, in a range between 1 bar and 10 bar, if necessary even up to 15 bar. Pressure d3 is generated by booster pump 6. This pressure d3 may be set and maintained at a constant level by feedback control of a signal of a pressure sensor at the end of the crystallization arrangement and by frequency-controlled driving of booster pump 6. The temperature downstream from booster pump 6 is approximately the same as the temperature upstream from booster pump 6. The liquid or water, including the granules contained therein, is pumped by booster pump 6 into a pipe that is used in spiral form in a crystallization vessel 7 whose temperature is regulated by heat transfer oil or steam. In this case, the liquid, including the granules contained therein, is heated to crystallization temperature T3. The heat transfer oil or steam is temperature-regulated or heated by a suitable heating device 8.

The cross section of the pipe, as is incidentally preferred within the entire system, is again dimensioned in such a way that a flow rate of the liquid, including the granules contained therein, always lies above the settling rate of these granules.

In the crystallization step as well, the length of the pipe used in the crystallization vessel is determined on the basis of the selected cross section and the required retention time or the desired crystallization period. This preferably lies in the range between one minute and 10 minutes, but may also lie in the range up to 30 minutes, more preferably in the range between two minutes and four minutes. In general, the selected crystallization period should be selected depending on the material used.

A heat exchanger 9, which removes heat from the liquid, including the granules contained therein, is situated at the end of the crystallization stage. In this case, the liquid, including the granules contained therein, is cooled to a temperature T5. A suitable pressure reduction device, e.g. a pressure reduction turbine having a frequency-controlled drive (reference numeral 10) is subsequently used to lower the pressure of the liquid, including the granules contained therein, from pressure d3 to a pressure d5. Pressure d5 preferable lies slightly above or precisely at the boiling pressure specified for the liquid used at the present temperature. d5 may be set and maintained at a constant level with the aid of a measuring signal of a pressure sensor downstream from a heat exchanger 11 and by feedback connection to the frequency-controlled drive of pressure reduction device (e.g. a pressure reduction turbine) 10. Before the granules are separated from the liquid, heat is removed from the mixture of liquid and granules in heat exchanger 11, it being possible, for example, to used this heat for regulating the temperature of stored liquid 15. In this case, the temperature of the liquid, including the granules contained therein, is cooled to a temperature T4<T5. Downstream from heat exchanger 11, the pressure of the liquid, including the granules contained therein, is reduced to a pressure d4<d5 by a suitable pressure reduction turbine 12 having a frequency-controlled drive, pressure d4 preferably being equal to starting pressure d1 and particularly preferably equal to atmospheric pressure. With the aid of a suitable feedback control, using a pressure signal that is obtained downstream from pressure reduction turbine 11 [sic; 12], it is possible to ensure that a constant pressure level is settable throughout the entire process and that fluctuations in process pressure within the system, in particular within the preferably closed system of liquid, including the granules contained therein, may be minimized.

The liquid, including the granules contained therein, is then supplied to a granule separator 13, in which the granules are separated from the liquid. The granules may be supplied to a further processing station or passed on for further processing, while the liquid is supplied to storage tank 15 by a pump 14. The temperature of the stored liquid in storage tank 15 may be regulated by a temperature regulator 16 and, if necessary, also by using the waste heat of heat exchanger 11 from the previous stage.

Instead of increasing the pressure in two stages, as described above (first from pressure d1 to pressure d2 and then to pressure d3), it is possible to increase the pressure directly to the level of pressure d3 of the crystallization step. This makes it possible to eliminate, for example, booster pump 6 in the system illustrated schematically in FIG. 1.

Moreover, instead of reducing the pressure in two stages, the pressure reduction from pressure d3 to pressure d4 may also take place in one stage. However, the temperature of the liquid should first be reduced to a temperature below the boiling temperature at atmospheric pressure by heat exchanger 9 or 11. In this manner, the pressure increases in a single stage without evaporating the liquid used.

If the temperature of the liquid does not drop below the boiling temperature at atmospheric pressure when reducing the pressure in a single stage, the liquid will at least partially evaporate. In a corresponding process, the independent separation of the granules from the liquid may be eliminated. The resulting steam may be captured and supplied back to the process following condensation. In the method according to the invention, the process may be carried out in such a way that the liquid, including the granules contained therein, is supplied to a closed system. The liquid, including the granules contained therein, may preferably be kept in constant motion.

Figure 2:
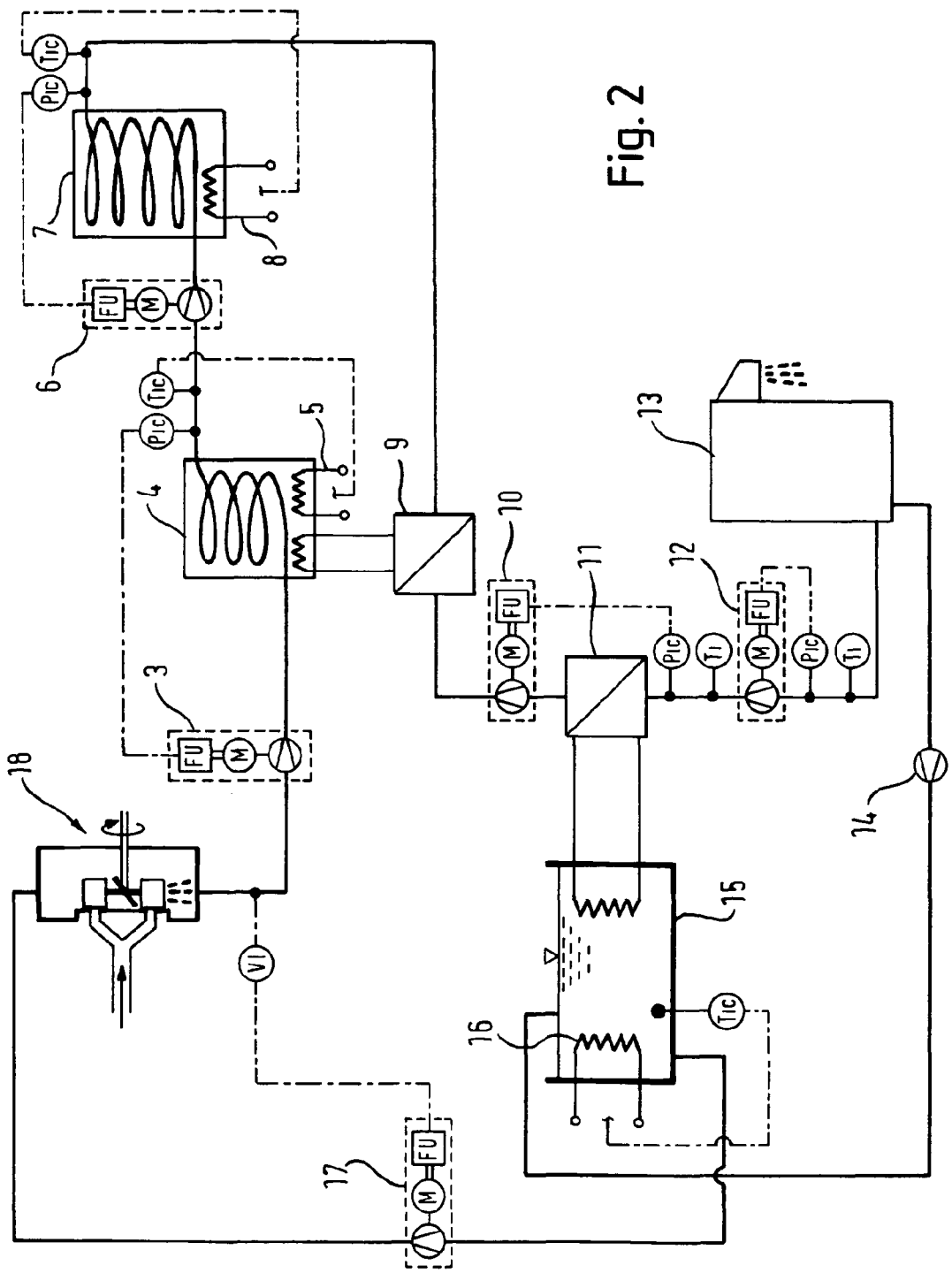
FIG. 2 shows a schematic view of a second device that may be used to carry out the method according to the invention, an underwater granulation device being used for granulation.

FIG. 2 shows a schematic view of a system or a device for carrying out the method according to the invention, in which an underwater granulation device 18 is used in FIG. 2 to granulate the polymer melt, in contrast to the embodiment in FIG. 1. This underwater granulation device is familiar to those skilled in the art, making it unnecessary to describe it in detail here.

In other respects, the device or the system, as illustrated in FIG. 2, corresponds to the system, as illustrated in FIG. 1, the explanations given above in connection with FIG. 1 also applying in connection with FIG. 2.

Figures 3A, 3B:
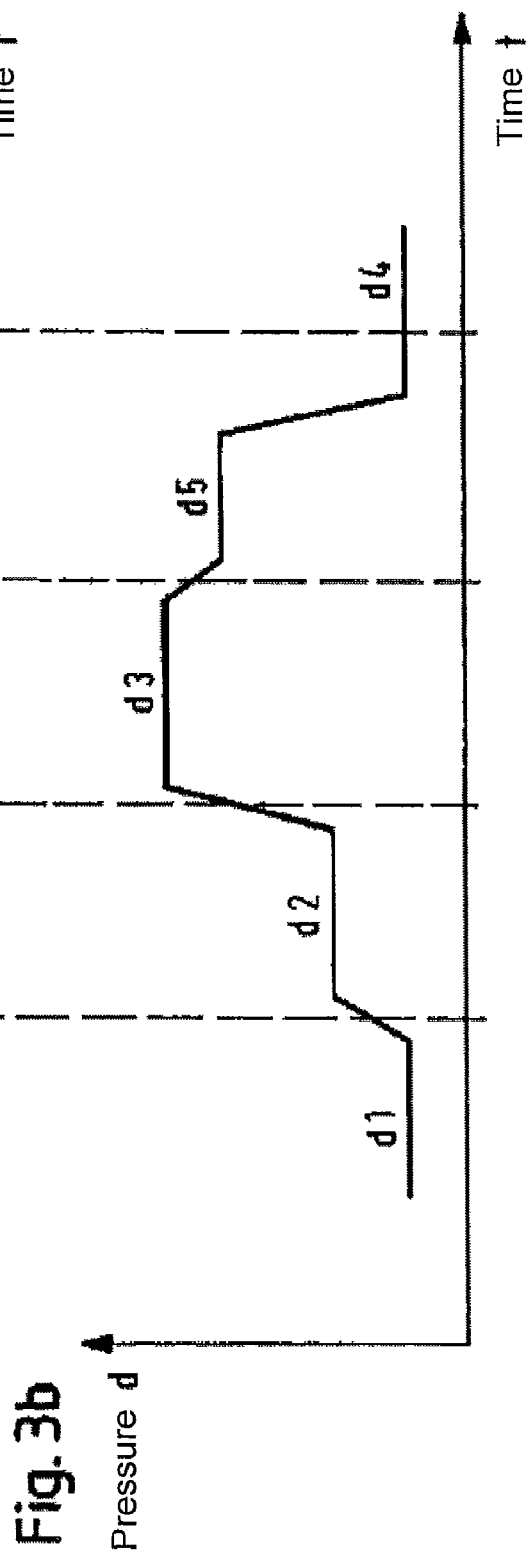
FIGS. 3a and 3b show two related diagrams which schematically illustrate the temperature and pressure curves, respectively, according to a preferred embodiment of the method according to the invention.

FIGS. 3a and 3b show two related diagrams which schematically illustrate the temperature and pressure curves, respectively, according to a preferred embodiment of the method according to the invention. The quantities of temperature, pressure and time illustrated in FIGS. 3a and 3b are not provided as absolute quantities and are intended only to reflect process tendencies.

The invention claimed is:

1. A method for granulating and crystallizing thermoplastic polymers, comprising:
   granulating a polyester melt for the purpose of producing granules;
   supplying the granules to a liquid under a pressure d1 and at a temperature T1;
   increasing the pressure of the liquid, including the granules contained thereon, to a pressure d2>d1; and
   increasing the temperature of the liquid, including the granules contained therein, to a temperature T2>T1;
   nucleating the granules in the liquid under the pressure d2 and at the temperature T2;
   increasing the temperature of the liquid, including the granules contained therein, to a temperature T3>T2;
   crystallizing the granules in the liquid at the temperature T3;
   decreasing the pressure and temperature of the liquid, including the granules contained thereon, to a pressure d4 and a temperature T4; and
   separating the granules from the liquid.

2. The method according to claim 1, wherein the liquid, including the granules contained therein, is supplied to a closed system.

3. The method according to claim 1, wherein the liquid, including the granules contained therein, is kept in motion.

4. The method according to one of claim 1, comprising the further steps:
   additionally increasing the pressure of the liquid, including the granules contained therein, to a pressure d3>d2 following nucleation;
   crystallizing the granules in the liquid under the pressure d3 and at the temperature T3.

5. The method according to claim 1, wherein the pressure and the temperature of the liquid, including the granules contained therein, are first decreased to a pressure d5>d4 and a temperature T5>T4 following crystallization.

6. The method according to claim 1, wherein the temperature T4 is the ambient temperature.

7. The method according to claim 1, wherein the temperature T1 lies in the range between 20° C. and 100° C.

8. The method according to claim 1, wherein the temperature T2 lies in the range between 80° C. and 180° C.

9. The method according to claim 1, wherein the temperature T3 lies in the range between 110° C. and 200° C.

10. The method according to claim 1, wherein the pressure d4 is equal to d1.

11. The method according to claim 1, wherein the pressure d1 is the atmospheric pressure.

12. The method according to claim 1, wherein the pressure d2 lies in the range between 1 bar and 10 bar.

13. The method according to claim 1, wherein the pressure d3 lies in the range between 1 bar and 10 bar.

14. The method according to claim 1, wherein the step of nucleating the granules in the liquid has a nucleation period of up to 10 minutes.

15. The method according to claim 1, wherein the step of crystallizing the granules in the liquid has a crystallization period of up to 30 minutes.

16. The method according to claim 1, wherein the temperature T2 lies in the range between 100° C. and 130° C.

17. The method according to claim 1, wherein the temperature T3 lies in the range between 120° C. and 160° C.

18. The method according to claim 1, wherein the pressure d2 lies in the range between 1 bar and 3 bar.

19. The method according to claim 1, wherein the pressure d3 lies in the range between 2 bar and 6 bar.

20. The method according to claim 1, wherein the step of nucleating the granules in the liquid has a nucleation period in the range between 1 minute and 10 minutes.

21. The method according to claim 1, wherein the step of nucleating the granules in the liquid has a nucleation period in the range between 2 minutes and 4 minutes.

22. The method according to claim 1, wherein the step of crystallizing the granules in the liquid has a crystallization period in the range between 1 minute and 10 minutes.

23. The method according to claim 1, wherein the step of crystallizing the granules in the liquid has a crystallization period in the range between 2 minutes and 4 minutes.

* * * * *